United States Patent [19]

Rokuda et al.

[11] Patent Number: 4,855,812
[45] Date of Patent: Aug. 8, 1989

[54] PICTURE SYNTHESIZING APPARATUS WITH GAIN CONTROL SYSTEM

[75] Inventors: Morito Rokuda; Hiroyasu Ohtsubo; Michio Masuda; Hideo Nishijima; Kaneyuki Okamoto, all of Katsuta, Japan

[73] Assignee: Hitachi, Ltd., Tokyo, Japan

[21] Appl. No.: 133,360

[22] Filed: Dec. 15, 1987

[30] Foreign Application Priority Data

Dec. 18, 1986 [JP] Japan .................................. 61-299998
Jan. 20, 1987 [JP] Japan ..................................... 62-8926

[51] Int. Cl.$^4$ .......................... H04N 5/272; H04N 9/68
[52] U.S. Cl. ........................................ 358/22; 358/183
[58] Field of Search ................. 358/183, 181, 22, 174, 358/178

[56] References Cited

U.S. PATENT DOCUMENTS

| 4,141,041 | 2/1979 | Peters | 358/183 |
| 4,367,484 | 1/1983 | Kuroyanagi | 358/22 |
| 4,578,698 | 3/1986 | Miki | 358/22 |
| 4,613,906 | 9/1986 | Tanaka | 358/183 |
| 4,712,130 | 12/1987 | Casey | 358/22 |

FOREIGN PATENT DOCUMENTS 92015 7/1979 Japan .

Primary Examiner—Tommy P. Chin
Attorney, Agent, or Firm—Antonelli, Terry & Wands

[57] ABSTRACT

A picture synthesizing apparatus in which a main picture is displayed with a part inlaid with a subsidiary picture. The apparatus includes an AGC circuit for regulating the gain of the main video signal and an AGC circuit for regulating the gain of a subsidiary video signal. Alternatively, the chrominance signal level of the subsidiary video signal can be regulated in accordance with the chrominance signal level of the main video signal.

12 Claims, 9 Drawing Sheets

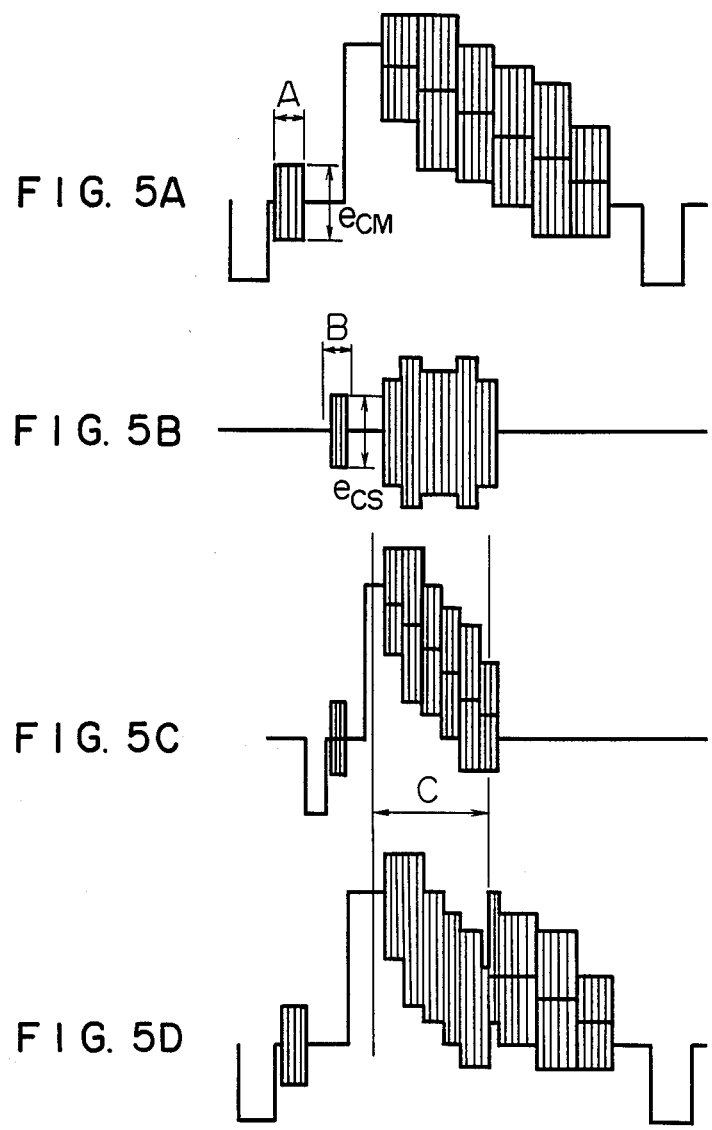

PICTURE SYNTHESIZING APPARATUS WITH GAIN CONTROL SYSTEM

BACKGROUND OF THE INVENTION

The present invention relates to a picture synthesizing apparatus for synthesizing two or more kinds of video signals to thereby allow a composite picture to be displayed on a monitor device in such a manner that a main picture (or parent picture) is inlaid as a part thereof with a subsidiary picture (or daughter picture) in a compressed form.

With the remarkable advance of semiconductor technology in recent years, digital signal processing techniques employing digital memories tend increasingly to be adopted in various video equipment and apparatus for home use. As an example of such applications, there is known a digital television receiver imparted with a so-called picture-in-picture function (also referred to as P-in-P function in abbreviation) in which two kinds of video signals are synthesized such that a main picture displayed on a monitor device is inlaid with a subsidiary picture in a compressed or contracted form so that two pictures can be simultaneously displayed. The technology concerning this picture-in-picture function is discussed, for example, in Japanese periodicals titled "Television Technology", No. 9 (Sept., 1984), p.p. 25–29, and No. 12 (Dec., 1984), p.p. 31–", Japanese Patent Laid-Open No. 92015/1979 (JP-A-54-92015) and others.

The above-mentioned picture-in-picture function known heretofore was developed for application to the television receiver. By virtue of this picture-in-picture function, a picture originating in a television broadcast, a video tape recorder (VTR) or the like is displaced as a parent or main picture available from another source, such as another VTR, a video disc system, satellite broadcast or the like, is simultaneously displayed as a subsidiary picture (daughter picture) as a part of the main picture. In most of the picture-in-picture type television receivers, the P-in-P function is provided by controlling the driving signals of the cathode ray tube of the television receiver such that the video signal for the main picture is changed over to the video signal for the subsidiary picture at a predetermined local area of the main picture. (This can be accomplished in general by storing the video signal for the subsidiary picture in a video memory and reading therefrom the same video signal in timing with synchronization for the main picture so that the subsidiary picture can be inlaid in the main picture).

In this connection, it is noted that the amplitude levels of the video signals as inputted are not always constant. By way of example, at the present state of the television technology, there may occur as large a deviation or fluctuation as $1\pm0.2$ V in the amplitude level among the receiver channels at the stage of tuner. Needless to say, such variation in the amplitude level brings about a significant difference in contrast between the main picture and the subsidiary picture to the discomfort of the viewer. Particularly in case the main picture is bright while the subsidiary picture is dim, the latter becomes more difficult to view. Further, since the synthesized signal is subjected to processing in the monitor apparatus, variation in the amplitude level of both or either one of the video signals for the main and subsidiary pictures will result in the appearance of buzz noise and white eyesores as well as very poor contrast, particularly when the pictures are dim, to great disadvantages. Unless the video signals to be synthesized for the main picture and the subsidiary picture coincide with each other in respect to the chrominance signal level, a difference in color density will occur between the main picture and the subsidiary picture, giving rise to unnaturalness. As an attempt to solve this problem, it is known heretofore to perform an automatic color control processing (also referred to a ACC processing) on the composite video signal for the main picture. In that case, in order to accomplish the alignment of the chrominance signal level for the main picture and the subsidiary picture, it is possible to perform processing such as luminance/chrominance signal separation (also referred to as Y/C separation), modulation/demodulation and the like on both of the composite video signals for the main picture and the subsidiary picture. In this connection, it is observed that the Y/C separation mentioned above is usually accompanied with degradation in the frequency characteristic particularly for the luminance or Y signal), because each of the luminance (Y) signal and the chrominance (C) signal for the main picture requires the whole frequency band, differing from the case of the Y/C signals for the subsidiary picture. To prevent deterioration in the frequency characteristics upon Y/C separation, a comb line filter, implemented by making use of a 1H-delay line or the like, it is necessitated, which means, however, that the circuit scale is undesirably increased.

It is therefore a general object of the present invention to provide a picture synthesizing apparatus which allows a main (parent) picture and a subsidiary picture (daughter picture) to be displayed in a satisfactory way.

It is a specific object of the present invention to provide a picture synthesizing apparatus which allows both a main picture and a subsidiary picture to be displayed at the preferred brightness.

Another specific object of the present invention is to provide a picture synthesizing apparatus capable of displaying a synthesized or combined picture in which coloration of both the main picture and the subsidiary picture can be maintained constant steadily.

Still another specific object of the present invention is to provide a picture synthesizing apparatus which can be implemented in a small scale circuit configuration and which can nevertheless maintain the coloration of a main picture and a subsidiary picture at a predetermined ratio.

A still further specific object of the present invention is to provide a picture synthesizing apparatus in which degradation and deterioration in the frequency bands of composite video signals for the main picture and the subsidiary picture as well as image quality thereof can be suppressed to minimum.

SUMMARY OF THE INVENTION

In view of the above objects, the picture synthesizing apparatus according to a general aspect of the present invention is so arranged that the amplitude levels of video signals for the main picture and the subsidiary picture are controlled to be equal to each other by means of an automatic amplitude control circuit. According to this feature, the amplitude levels of video signals for the main picture and the compressed or contracted subsidiary picture are made equal to each other, whereby a synthesized picture which is comfortable to view can be presented.

According to another feature of the invention, the picture synthesizing apparatus is implemented such that the chrominance signal level of the video signal for the main picture is detected, wherein gain of a variable gain amplifying means for amplifying the chrominance component of the video signal for the subsidiary picture is controlled or adjusted on the basis of the result of the above-mentioned detection, By virtue of this feature, the relative value of the chrominance signal levels for both the main picture and the subsidiary picture can be held constant, which in turn means that coloration of the main picture and the subsidiary picture is maintained constant at a predetermined ratio, whereby a synthesized or combined picture comfortable to view can be presented.

BRIEF DESCRIPTION OF THE DRAWINGS

FIGS. 5A to 5D are diagrams illustrating waveforms of signals produced in the circuit portions shown in FIG. 4;

DESCRIPTION OF THE PREFERRED EMBODIMENTS

Figure 1:
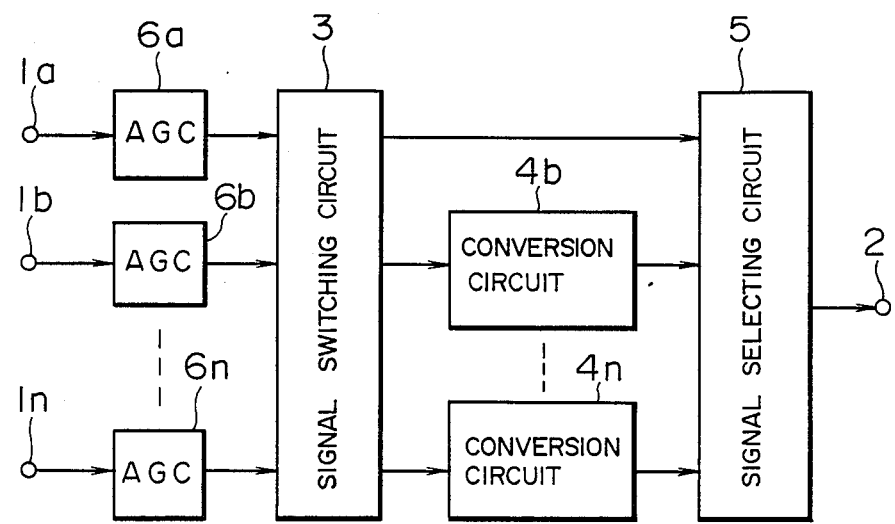
FIG. 1 is a block diagram of a general arrangement of the picture synthesizing apparatus according to an exemplary embodiment of the present invention.

FIG. 1 shows a general circuit arrangement of the picture synthesizing apparatus according to an embodiment of the present invention for illustrating the basic concept thereof. Referring to the figure, a plurality of input video signals are applied to input terminals 1a, 1b, ..., 1n, respectively. The input video signals applied to the input terminals 1a, 1b, ..., 1n are supplied to respective automatic gain control (AGC) circuits 6a, 6b, ..., 6n to be regulated in respect to the amplitude level and subsequently applied to a signal switching circuit 3, wherein one of the input video signals is selected as the video signal for a main picture with all the remaining input video signals being selected as the video signal for a subsidiary picture to be inlaid in the main picture. The main picture video signal (i.e. the video signal for the main picture) is supplied directly to a signal selecting circuit 5 from the signal switching circuit 3. The remaining subsidiary picture video signals (i.e. video signals for the subsidiary pictures) are inputted to associated conversion circuits 4b, ..., 4n, respectively, to be compressed separately. The subsidiary picture video signals outputted from the respective conversion circuits 4b, ..., 4n after having been compressed are also supplied to the signal selecting circuit 5, which is so arranged that the main picture video signal is normally selected as the output signal while selecting as the output signal, the compressed subsidiary picture video signal from any one of the associated conversion circuits 4b, ... 4n whenever it is to be supplied. In this manner, the subsidiary picture video signal is inserted in the main picture video signal, whereby the inlaying synthesization is accomplished. The synthesized video signal outputted from the signal selecting circuit 5 is supplied to a monitor (not shown) from an output terminal 2. Thus, there is displayed on the monitor a combined or synthesized picture which includes a main picture produced on the basis of the main picture video signal and having a part inlaid with a subsidiary contracted picture based on the subsidiary picture video signal.

It should be mentioned here that the AGC circuits 6a, 6b, ..., 6n have the same reference level and same characteristics set previously. Consequently, the individual video signals outputted from the respective AGC circuits 6a, 6b, ..., 6n are of a same amplitude level. Thus, the signal switching circuit 3 is supplied with individual video signals of the same amplitude level. As the result, the main picture video signal and the subsidiary picture video signal contained in the synthesized video signal outputted from the signal selecting circuit 5 are at a same amplitude level. This in turn means that the main picture and the subsidiary picture displayed on the monitor are identical in respect to contrast and brightness, producing neither buzz noise nor white eyesores, and thus assuring constantly the main picture and the subsidiary picture are comfortable for viewing without being accompanied with degradation in the contrast even when the picture is dim.

In conjunction with the circuit arrangement shown in FIG. 1, it should be understood that the signal selecting circuit 5 can be so arranged as to select only one of the subsidiary picture video signals outputted from the conversion circuits 4b, ..., 4n for thereby allowing only one inlaid subsidiary picture to be displayed or alternatively to select a plurality of the subsidiary picture video signals to inlay a corresponding number of subsidiary pictures in the main picture. In the latter case, provision is made to ensure that the subsidiary picture video signals can be outputted from the respective conversion circuits 4b, ..., 4n in a predetermined timing sequence to thereby prevent these picture signals from overlapping one another.

Figure 2:
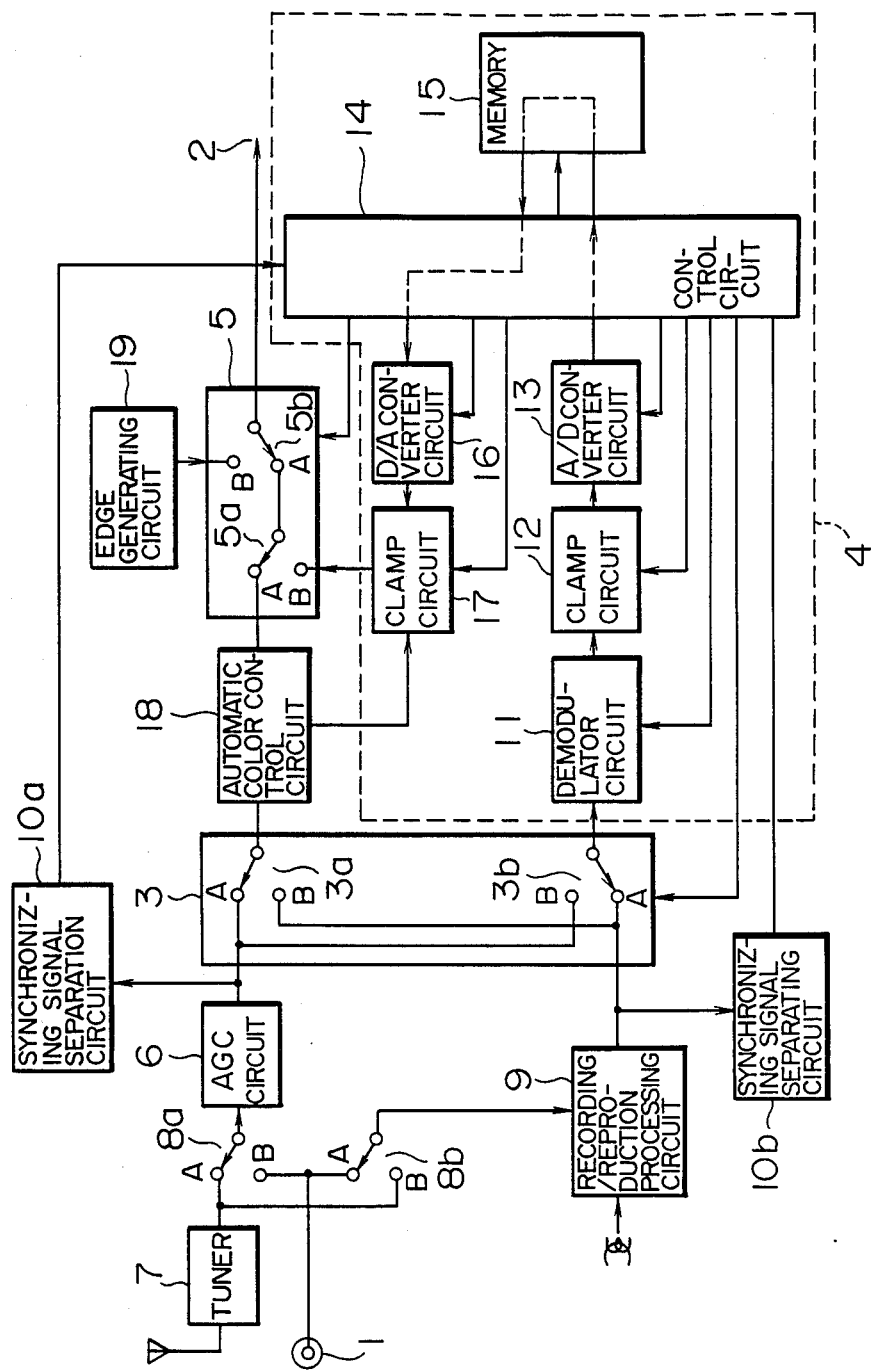
FIG. 2 is a block diagram showing a picture synthesizing apparatus according to a second embodiment of the present invention.

FIG. 2 shows the picture synthesizing apparatus according to a second embodiment of the present invention, which apparatus is implemented on the assumption that the invention is to be applied to a video tape recorder (VTR). In FIG. 2, parts having equivalent or the same functions as described above in conjunction with FIG. 1 are denoted by like reference symbols.

A reference numeral 1 denotes an input terminal to which a video signal is applied from a video camera, other video tape recorder, a television receiver or the like video apparatus. A broken line block 4 represents a conversion circuit destined for compressing the subsidiary picture video signal, which circuit 4 is constituted by a demodulator circuit 11, a clamp circuit 12, an analogue-to-digital (A/D) converter circuit 13, a control circuit 14, a memory 15, digital-to-analogue (D/A) converter circuit 16 and a clamp circuit 17.

Next, assuming that the video signal received by a tuner 7 is utilized for generating a main picture while the video signal applied to the input terminal 1 is used for generation of a subsidiary picture, description will be made below of the operation of the picture synthesizing apparatus shown in FIG. 2.

Usually, the change-over switches 8a, 8b and change-over switches 3a, 3b incorporated in the signal switching circuit 3 are closed to the respective contacts A while the change-over switches 5a and 5b incorporated in the signal selecting circuit 5 are closed to respective contacts B.

The input signal incoming from the tuner 7 is supplied to the AGC circuit 6 through the change-over switch 8a to be regulated in respect to the amplitude level. Subsequently, the amplitude-adjusted signal is supplied to an automatic color control circuit 18 as the main picture video signal by way of the change-over switch 3a of the signal switching circuit 3. The main picture video signal having the amplitude of chrominance signal component regulated by the automatic color control circuit 18 is then supplied to the signal selecting circuit 5.

On the other hand, the input video signal applied to the input terminal 1 is supplied to a recording/reproducing circuit 9 through the change-over switch 8b. Provided in the recording processing system of this recording/reproducing circuit 9 is an AGC (automatic gain control) circuit for regulating the amplitude level of the video signal supplied to the recording/reproducing circuit 9, the output signal of which is then supplied to the conversion signal 4 as the subsidiary picture video signal through the change-over switch 3b of the signal switching circuit 3. It should be noted that the AGC circuit 6 and the above-mentioned AGC circuit incorporated in the recording/reproducing circuit 9 have the same reference level and identical characteristics. Thus, the amplitude level of the subsidiary picture video signal is made equal to that of the main picture video signal.

The output signal of the recording/reproducing circuit 9 is also supplied to a synchronizing signal separating circuit 10b. In this separating circuit 10b, the synchronizing signal is separated from the video signal.

In the conversion circuit 4, the subsidiary picture video signal undergoes by the demodulating circuit 11 and the clamp circuit 12 and is subsequently converted to a digital signal by A/D converter circuit 13, the resulting digital signal being written in the memory 15. The control circuit 14 is supplied with the synchronizing signal which was separated from the video signal supplied from the recording/reproducing circuit 9 by the synchronizing signal separating circuit 10. On the basis of this synchronizing signal, the control circuit 14 controls operation of the demodulating circuit 11 and the clamp circuit 12, while setting the sampling frequency of the A/D converter circuit 13, and additionally controls the writing operation to the memory 15. On the other hand, the output signal of the AGC circuit 6 is inputted to the synchronizing signal separating circuits 10a, by which the synchronizing signal is separated from the inputted video signal. The synchronizing signal thus derived is inputted to the control circuit 14. On the basis of this synchronizing signal, the control circuit 14 reads out the video signal from the memory 15 at such timing and read-out rate that the subsidiary picture can be inlaid at a predetermined area of the main picture. The video signal read out from the memory 15 is then compressed at a ratio corresponding to the ratio of screen areas selected for the main picture and the subsidiary picture, respectively. The video signal read out from the memory 15 is supplied to the D/A converter circuit 16, to be converted into an analogue signal under the control of the control circuit 14. The analogue signal is then clamped by the clamp circuit 17 so as to have the same reference level as that of the main picture video signal outputted from the automatic color control circuit 18. The clamped analogue signal is then supplied to the signal selecting circuit 5.

The automatic color control circuit 18 serves to adjust or regulate the amplitudes of chrominance signal component of the main picture video signal and that of the subsidiary picture video signal with the aid of color burst signals thereof so that the respective amplitudes are always equal to each other.

The control circuit 14 controls the signal selecting circuit 5 by using as the reference timing signal the synchronizing signal outputted from the synchronizing signal separating circuit 10a. Now, operation of the signal selecting circuit 5 will be described. Usually, the change-over switches 5a and 5b are closed to the respective contacts A, whereby the main picture video signal is selected as the output of the signal selecting circuit 5. At the time point for starting the subsidiary picture inlaying operation in every horizontal scanning period for the main picture, the change-over switch 5b is transiently closed to the contact B for a short time, causing an edge generating circuit 19 to output an edge pulse. Thereafter, the change-over switch 5b is closed to the contact A with the change-over switch 5a being closed to the contact B, whereby the compressed subsidiary picture video signal is selected to be outputted. At the time point when the subsidiary picture inlaying operation is to be ended in every horizontal scanning period, the change-over switch 5b is closed to the contact B, as the result of which an edge pulse of a short duration is outputted. Subsequently, the change-over switches 5a and 5b are closed to the contacts A, respectively, whereby the main-picture video signal is now selected as the output signal. Further, in a period corresponding to a predetermined number of horizontal scanning lines immediately preceding the first horizontal scanning line at which the subsidiary picture inlaying operation starts, the change-over switch 5b is closed to the contact B for a period corresponding to the time required for the subsidiary picture to be inlaid, whereupon the edge pulse if produced. Additionally, in a period corresponding to a predetermined number of horizontal scanning lines following immediately the last horizontal scanning line for the subsidiary picture inlaying operation, the switch 5b is closed to the contact B during a period corresponding to that required for the subsidiary picture inlaying operation, whereby the edge pulse is produced.

In this manner, the subsidiary picture video signal and the edge pulses are inserted in the main picture video signal in the signal selecting circuit 5, the resulting synthesized signal being outputted by way of an output terminal 2 to be supplied to a monitor (not shown). As the consequence, a synthesized picture is displayed on the monitor, which picture consists of a main picture having a part inlaid with a subsidiary picture. Because of the edge pulses being inserted in the main picture video signal, as mentioned above, the contour of the subsidiary picture is also displayed, whereby the main picture and the subsidiary picture as displayed can be clearly distinguished from each other.

It will now be understood from the foregoing description that by virtue of the arrangement in which the AGC circuit 6 is imparted with the same characteristic as that of the AGC circuit incorporated in the recording/reproducing circuit 9 according to the illustrated embodiment shown in FIG. 1, the main picture video signal and the subsidiary picture video signal are so adjusted as to have the same amplitude level, with the former being processed by the AGC circuit 6 while the latter processed by the AGC circuit incorporated in the recording/reproducing circuit. As a result, the main picture and the subsidiary picture can be displayed with the same contrast and with the same brightness without being accompanied with buzz noise and white eyesore, whereby a composite picture comfortable to view can be obtained.

As will be seen from the above, in the case of the embodiment shown in FIG. 2, the AGC circuit 6 as well as the AGC circuit incorporated in the recording/reproducing circuit 9 is rendered operative when the input signal is of sufficiently large amplitude to thereby assure a composite picture easy to see. However, when the video signals become too feeble for these AGC circuits to hold constant the amplitude levels of the main picture video signal and the subsidiary picture video signal, difficulty will be encountered in producing an easy to see composite picture easy to see. In particular when the main picture video signal is of a small amplitude, color density of the subsidiary picture increases excessively, resulting in more or less discomfort to the viewer. This problem can be solved by regulating the amplitude of the chrominance signal component of the subsidiary picture video signal in correspondence to the amplitude of the main picture video signal.

Next, description will be made of an embodiment of the invention according to which the amplitude of the chrominance signal of the subsidiary picture video signal is regulated in dependence on the amplitude level of the chrominance signal component of the main picture video signal.

Figure 3:
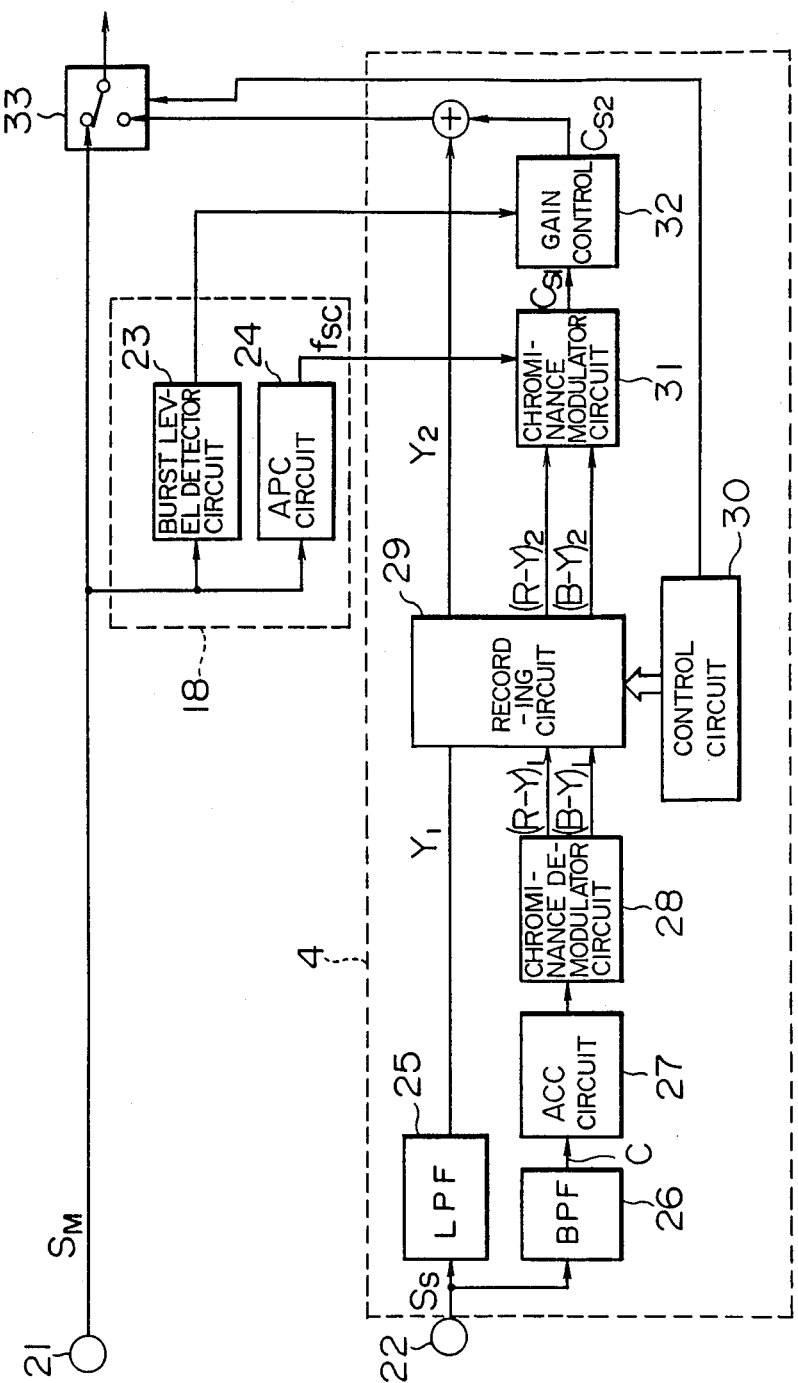
FIG. 3 is a diagram showing an arrangement of a third embodiment of the invention.

FIG. 3 shows a third embodiment of the present invention which is so designed as to hold constant or uniform the coloration of both the main picture and the subsidiary picture. This third embodiment differs from the one shown in FIG. 2 in respect to the structure of the conversion circuit 4 and the automatic color control circuit 18.

The composite video signal $S_M$ for the main picture is applied to an input terminal 21, while the composite video signal $S_S$ for the subsidiary picture is applied to an input terminal 22. A reference numeral 23 denotes a burst level detection circuit, 24 denotes an automatic phase control circuit (hereinafter referred to as APC circuit in abbreviation), 25 denotes a low-pass filter (LPF), 26 denotes a band pass filter (BPF), 27 denotes an automatic color control (ACC) circuit, 28 denotes a chrominance demodulator circuit, 29 denotes a recording circuit, 39 denotes a control circuit, 31 denotes a chrominance modulator circuit, 32 denotes a gain control circuit, and finally a reference numeral 33 denotes a switching circuit.

The main picture composite video signal $S_M$ applied to the input terminal 21 is supplied to the switching circuit 33, whose switching operation is controlled by the control circuit 30, and at the same time to the burst level detector circuit 23 and the APC circuit 24. The burst level detector circuit 23 serves to extract the burst signal of the chrominance signal component from the main picture composite video signal $S_M$ supplied thereto and to detect the burst signal level from the extracted burst signal. The detected burst signal level is compared with a reference level to detect the magnitude of attenuation (or enhancement) relative to the rated level of the main picture chrominance signal. This detected value is supplied to the gain control circuit 32. On the other hand, the APC circuit 24 extracts the burst signal of the main picture chrominance signal $S_M$ to generate a chrominance subcarrier $f_{SC}$ for chrominance modulation of the subsidiary picture video signal which is phase-locked to the extracted burst signal, the chrominance subcarrier $f_{SC}$ being then supplied to the chrominance modulator circuit 31.

The composite video signal $S_S$ for the subsidiary picture applied to the input terminal 22 is supplied to the LPF 25 and the BPF 26, whereby a luminance signal $Y_1$ is separated by the LPF 25, and the chrominance signal component C is separated by the BPF 26. The separated luminance signal $Y_1$ is supplied to the recording circuit 29 with the chrominance signal C supplied to the ACC circuit 27. The chrominance signal C supplied to the ACC circuit 27 is so controlled by the circuit 27 as to have a desired constant amplitude level and thereafter is sent to the chrominance demodulator circuit 28. The chrominance signal supplied to the chrominance demodulator circuit 28 is demodulated to color difference signals $(R-Y)_1$ and $(B-Y)_1$. These demodulated color difference signals $(R-Y)_1$ and $(B-Y)_1$ are supplied to the recording circuit 29.

The luminance signal $Y_1$ and the color difference signals $(R-Y)_1$ and $(B-Y)_1$ thus obtained are recorded by the recording circuit 29 whose write and read operations are controlled by the control circuit 30. The recording circuit 29 comprises, for example, an A/D converter for converting an inputted analogue signal to a digital signal, a memory for memorizing the digital signal, and a D/A converter for converting a digital signal read out from the memory to an analogue signal and for outputting the analogue signal, and etc. The signals once recorded are read out again in timing with the synchronizing signal of the main picture video signal. This read operation is carried out at a higher speed than the writing operation. As the consequence, the signals mentioned above are compressed so that they can be inserted in the main picture composite video signal $S_M$. The color difference signals $(R-Y)_2$ and $(B-Y)_2$ as read out from the recording circuit 29 are supplied to the chrominance modulator circuit 31 to undergo again modulation by the chrominance subcarrier $f_{SC}$ locked in phase to the burst signal of the chrominance component extracted from main picture video signal. The subsidiary picture chrominance signal $C_{S1}$ resulting from the modulation of the color difference signals $(R-Y)_2$ and $(B-Y)_2$ is supplied to the gain control circuit 32 whose gain is controlled in dependence on the detected value of the burst level supplied from the burst level detector circuit 23. It should be noted that the subsidiary picture chrominance signal outputted from the ACC circuit 27 is thus regulated to have a predetermined level. Accordingly, the subsidiary picture chrominance signal $C_{S1}$ supplied to the gain control circuit 32 from the chrominance modulator circuit 31 is also held at a predetermined level. The subsidiary picture chrominance signal $C_{S1}$ inputted to the gain control circuit 32 is enhanced (or attenuated) by an amount determined in dependence on the amount of enhancement (or attenuation) relative to the rated level of the main picture chrominance signal. Assuming, by way of example, that the level of the main picture chrominance signal is attenuated (or enhanced) by 3 dB when compare with the rated level, the subsidiary picture chrominance signal is attenuated (or enhanced) by 3 dB relative to the set level. The subsidiary picture chrominance signal $C_{S2}$ outputted from the gain control circuit, after having undergone the gain control mentioned above, is then mixed with the luminance signal $Y_2$, as the result of which there can be obtained the compressed composite video signal for the subsidiary picture which can be inserted in the main picture composite video signal $S_M$. The switching circuit 33 outputs selectively the two composite video signals supplied thereto (i.e. the main picture composite video signal and the compressed subsidiary picture composite video signal), whereby the picture-in-picture composite video signal having the subsidiary picture composite video signal inserted therein is produced.

In the picture-in-picture composite video signal thus formed, the level of the subsidiary picture chrominance signal is always held constant relative to the main picture chrominance signal without the main picture composite video signal undergoing the Y/C separation. In other words, no degradation takes place in the frequency characteristic of the main picture composite video signal because the latter is not separated into the luminance (Y) and chrominance (C) components.

The synthesized picture-in-picture composite video signal thus prepared is supplied to the color television receiver (not shown). In this color television receiver, the ACC processing is performed on the basis of the burst signal derived from the main-picture video signal. In that case, since the relation of the signal level between the main picture and the subsidiary picture chrominance signals is held at a predetermined ratio, the level of the subsidiary picture chrominance signal is also maintained constant. Thus, coloration of the main picture and the subsidiary picture can remain constant. Besides, since the main picture composite video signal undergoes no particular signal processing except for the processing for inserting the subsidiary picture composite video signal, there occur no unwanted phenomena such as degradation in frequency characteristic and other which incur deterioration in the quality of the displayed picture.

On the other hand, the ACC processing may be performed on the subsidiary picture video signal at the stage of the picture-in-picture video signal at the stage of the picture-in-picture inlaying operation for forming the composite video signal by controlling the gain of the chrominance signal in succession to the Y/C separation for separating the chrominance signal C and the luminance signal Y in consideration of the fact that such separation is generally required at the time point of storage in the memory. In this connection, it is noted that the subsidiary picture has to be contracted in general. Accordingly, if the subsidiary picture is to be contracted at a ratio of 1/N (e.g. N=2, 3 or 4), the band required for the luminance signal and the chrominance signal is reduced to 1/N of the inherent band required otherwise. Accordingly, no degradation in the frequency characteristics of the luminance (Y) signal and the chrominance (C) signal can take place upon Y/C separation. Thus, there will arise no problem concerning the picture quality and the signal processing.

Thus, according to the third embodiment of the invention described above, the subsidiary picture chrominance signal level of the picture-in-picture composite video signal is always maintained constant relative to the main picture chrominance signal without the main picture composite video signal undergoing the Y/C separation. As the result, coloration of the main picture and the inlaid subsidiary picture can be held at a desired constant level without being accompanied with degradation in the image quality of the main picture.

In connection with the third embodiment, it should be noted that the image quality control can be performed in a more satisfactory manner if the AGC circuit shown in FIGS. 1 and 2 is provided at the stages preceding to the input terminals 21 and 22, respectively.

The arrangement according to the third embodiment in which the picture-in-picture operation is carried out at the level of the standard video signal requires no alteration or change of the television receiver at all and thus can be advantageously implemented in the form of an adapter or alternatively incorporated in other video apparatus than the television receiver such as, for example, a video tape recorder (VTR), a video disc player (VDP) and other components to enhance the performance of these apparatus more effectively.

Figure 4:
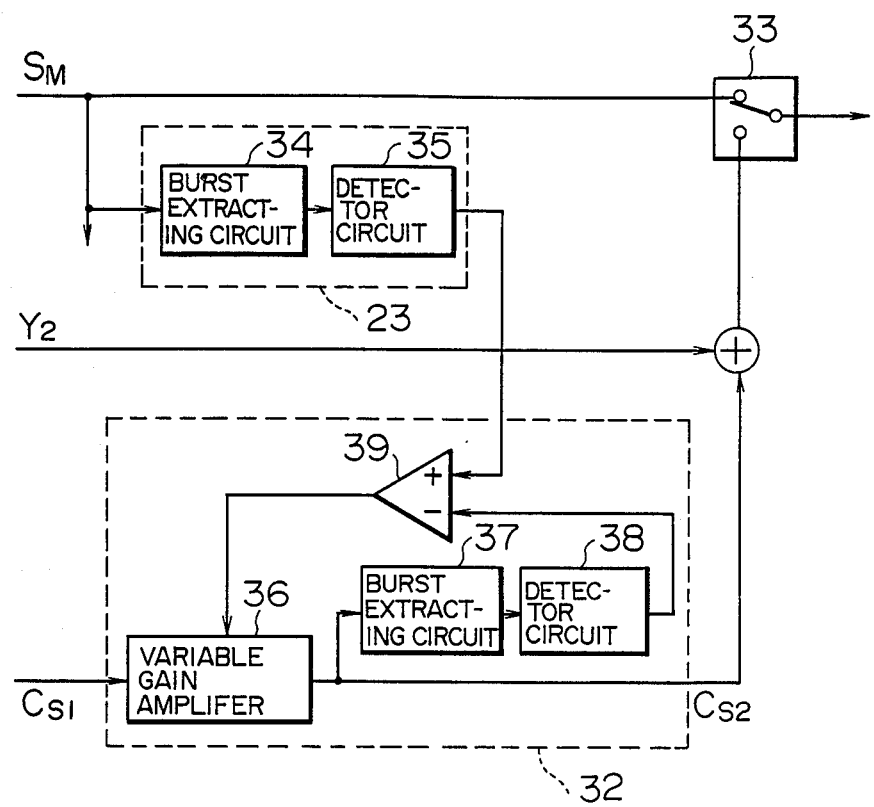
FIG. 4 is a block diagram showing a main portion of the picture synthesizing apparatus according to a fourth embodiment of the invention.

FIG. 4 shows a fourth illustrative embodiment of the picture synthesizing apparatus according to the present invention. The circuit configuration of the picture synthesizing apparatus shown in FIG. 4 differs from the one shown in FIG. 3 in that burst extracting circuits 34 and 37, detector circuits 35 and 38, a variable gain amplifier 36 and a comparator 39 are provided. In FIG. 4, the same or equivalent parts to those shown in FIG. 3 are attached with like reference symbols.

More specifically, in the case of the fourth embodiment shown in FIG. 4, the burst level detecting circuit 23 shown in FIG. 3 is constituted by a burst extracting circuit 34 and a detector circuit 35, while the gain control circuit 32 is composed of a variable gain amplifier 36, a burst extracting circuit 37, a detector circuit 38 and a comparator 39.

The arrangement and operation of the other components of the picture synthesizing apparatus such as the APC circuit 24, LPF 25, BPF 26, ACC circuit 27, chrominance demodulator circuit 28, recording circuit 29, control circuit 30 and the chrominance modulation circuit 31, all not shown in FIG. 4, are same as those of the corresponding components shown in FIG. 3.

FIGS. 5A to 5D show signal waveforms for illustrating operation of the circuit arrangement shown in FIG. 4.

In FIGS. 5A to 5D, waveforms of color bar signals sequenced in the order of brightness are depicted on the basis of the main picture composite video signal and the subsidiary picture composite video signal.

The main picture composite video signal is supplied to the switching circuit 33 and to the burst extracting circuit 34. The latter serves to extract a signal segment having a period or duration A from the main picture composite video signal $S_M$ shown in FIG. 5A to derive the burst signal of the main picture composite video signal $S_M$. The extracted burst signal is supplied to the detection circuit 35 in which a burst amplitude level $e_{CM}$ (FIG. 5A) is detected and supplied to comparator 39. On the other hand, the contracted subsidiary picture chrominance signal $C_{S1}$ is supplied to the variable gain amplifier 36 in which the signal $C_{S1}$ is regulated in gain with the aid of the output signal produced by the comparator 39. The burst signal extracted from the subsidiary picture chrominance signal is contracted together with the latter and outputted from the recording circuit 29. Consequently, the signal supplied to the variable gain amplifier 36 from the recording circuit 29 (FIG. 3) assumes the waveform which contains the burst signal, as illustrated in FIG. 5B. The burst extracting circuit 37 operates to extract as the burst a signal segment of duration B (FIG. 5B) from the subsidiary picture chrominance signal $c_{S1}$ after the gain adjustment thereof. The detector circuit 38 detects the burst amplitude level $e_{CS}$ (FIG. 5B) from the burst signal supplied from the burst extracting circuit 37, wherein the detected value of the burst amplitude level $e_{CS}$ is supplied to the comparator 39. It is to be noted that gain of the comparator 39 is set at a sufficiently large value and that the comparator 39 cooperates with the variable gain amplifier 36, the burst extracting circuit 37 and the detector circuit 38 to constitute a control loop, which operates to make the detected value of the burst level of the subsidiary picture chrominance signal equal to the detected value of the burst level of the main picture chrominance signal. In this way, the level of the subsidiary picture chrominance signal is always maintained constant relative to the level of the main picture chrominance signal.

The subsidiary picture chrominance signal $C_{S2}$ having undergone the gain control is mixed with the subsidiary picture luminance signal $Y_2$. The subsidiary picture composite video signal (FIG. 5C) thus obtained is supplied to the switching circuit 33 to be inserted in the main picture composite video signal at a desired position or location C (FIG. 5C), whereby a picture-in-picture composite video signal (FIG. 5D) is obtained.

As will be seen from the foregoing description, the arrangement according to the fourth embodiment of the invention can also assure that the chrominance signal levels of the main picture and subsidiary picture video signals are maintained constant relative to each other, to similar advantageous effect as in the case of the third embodiment shown in FIG. 3.

Figure 6:
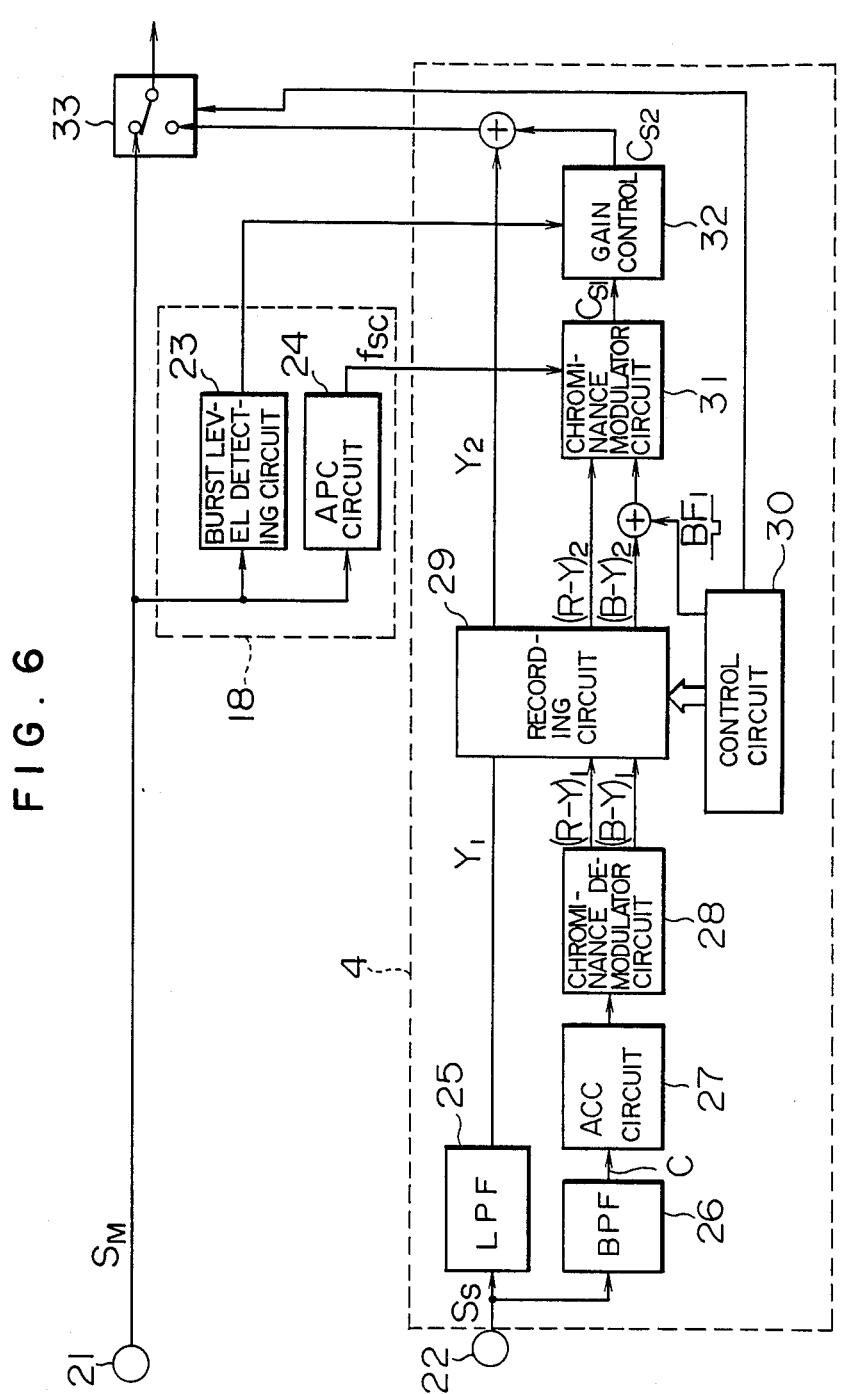
FIG. 6 is a block diagram showing a circuit arrangement of the picture synthesizing apparatus according to a fifth embodiment of the invention.

FIG. 6 is a block diagram showing a fifth embodiment of the picture synthesizing apparatus according to the present invention.

Figure 7A:
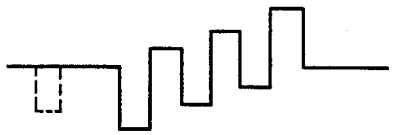
FIGS 7A and 7B are views illustrating signal waveforms produced at different points of the circuit shown in FIG. 6.
Figure 7B:
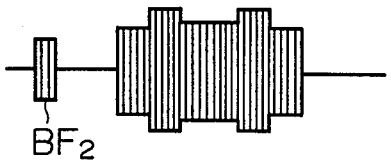

The picture synthesizing apparatus according to this embodiment is so arranged that the burst signal of the subsidiary picture chrominance signal is not recorded in the recording circuit 29 but added to the subsidiary picture chrominance signal after the latter is read out from the recording circuit 29. FIGS. 7A and 7B are waveform diagrams for illustrating how the burst signal is inserted, wherein FIG. 7A shows a color difference signal $(B-Y)_2$, and FIG. 7B shows the chrominance signal produced by the chrominance modulator circuit 31 after having undergone chrominance modulation.

The signal $(B-Y)_2$ is added with a burst flag pulse $BF_1$ for the burst signal before being inputted to the chrominance modulator circuit 31 as indicated by a broken line pulse in FIG. 7A. As the consequence, the chrominance modulator circuit 31 outputs the subsidiary picture chrominance signal $C_S$ containing the burst signal, as is illustrated in FIG. 7B. When the burst level detecting circuit 23 and the gain control circuit 32 are, respectively, of the structures shown in FIG. 4, the burst level of this subsidiary picture chrominance signal is compared with the burst level of the main picture chrominance signal. Parenthetically, operations of the gain control circuit 32 and others are the same as is in the case of the preceding embodiments shown in FIG. 3 or 4. Although the burst flag pulse $BF_1$ is added to the signal $(B-Y)_2$ in the form of a pulse of negative polarity, it will be appreciated that a positive pulse may be added as the burst flag pulse, $BF_1$ because only the amplitude level of the burst signal is of concern for the detection in the subsequent processing. Further, the burst flag pulse $BF_1$ may be added to the signal $(R-Y)_2$ instead of to the signal $(B-Y)_2$.

Figure 8:
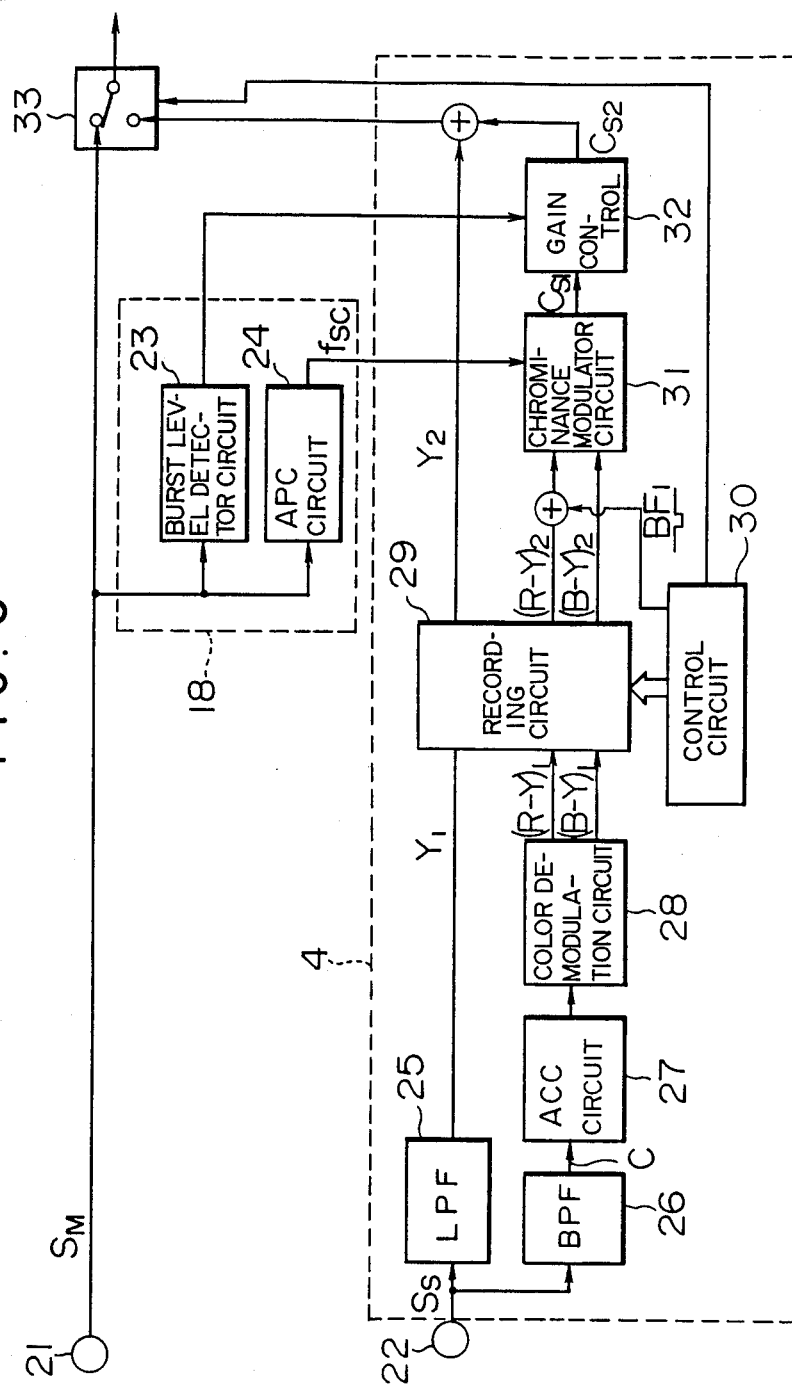
FIG. 8 is a view showing a sixth embodiment of the present invention.

An embodiment of the invention in which the burst flag pulse $BF_1$ is added to the signal $(R-Y)_2$ is shown in FIG. 8. Except that the burst flag pulse $BF_1$ is added to the signal $(R-Y)_2$, the circuit arrangement shown in FIG. 8 is the same as the one shown in FIG. 6. Since the operation and effect of the circuit arrangement shown in FIG. 8 are similar to those of the circuit shown in FIG. 6, any further description is unnecessary.

Figure 9:
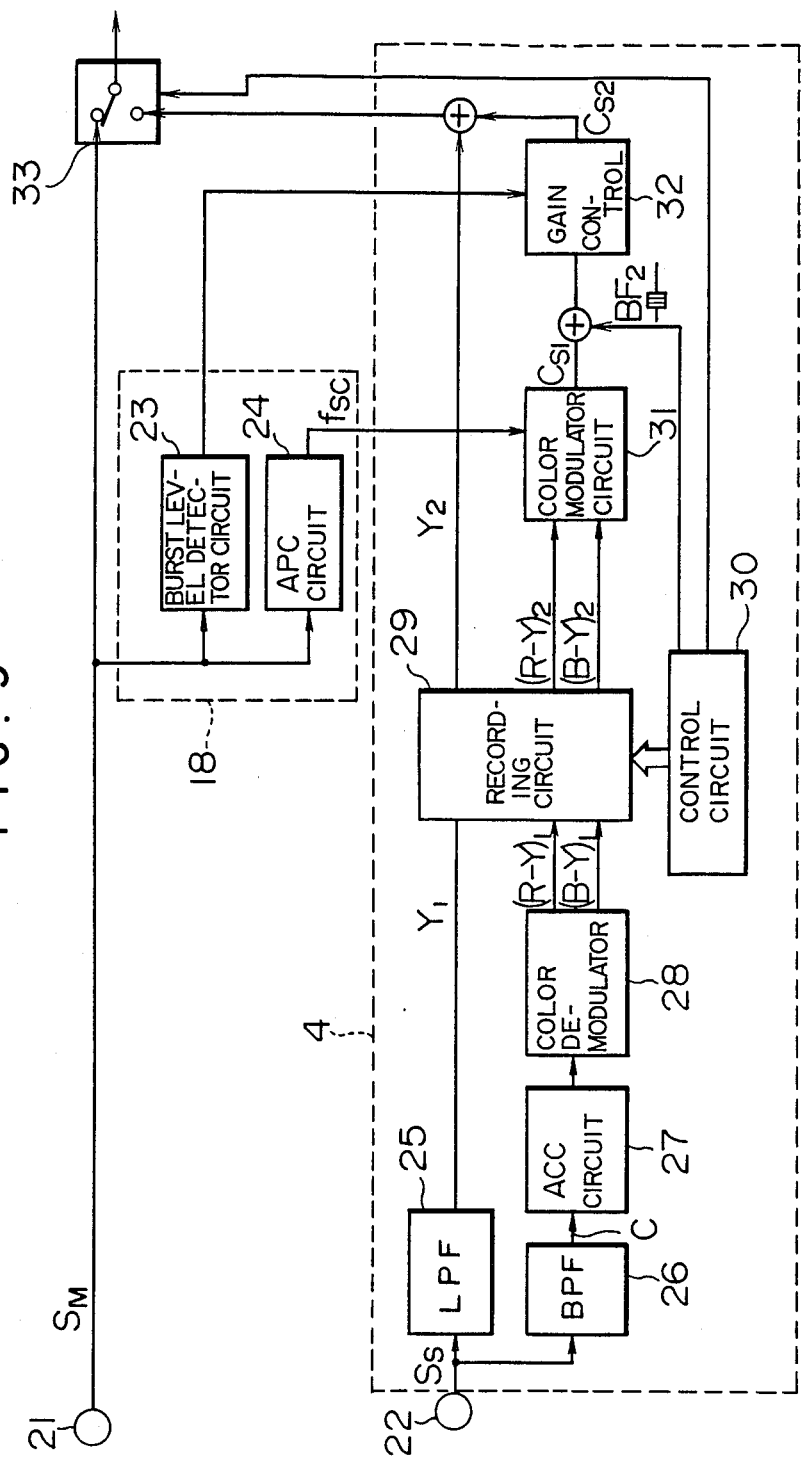
FIG. 9 is a view showing a seventh embodiment of the invention

FIG. 9 is a view showing a main portion of a seventh embodiment of the inventive picture synthesizing apparatus which is so arranged that a burst signal $BF_2$ is added to the subsidiary picture chrominance signal after the latter is read out from the recording circuit 29. This seventh embodiment differs from those shown in FIGS. 7 and 8 in that the burst signal $BF_2$ is added to the chrominance signal after having undergone the chrominance modulation, as will be seen from FIG. 9. In other respects, the circuit configuration and operation are identical with those of the embodiments shown in FIGS. 3 and 4. Accordingly, further description is omitted In any one of the embodiments shown in FIGS. 6, 8 and 9, the subsidiary picture chrominance signal is held constant at a predetermined level by the ACC circuit in precedence to being recorded. Accordingly, even when the burst signal is fixedly added subsequently, the relative ratio of level between the burst signal and the subsidiary picture chrominance signal remains unchanged. Accordingly, the embodiments shown in FIGS. 6, 8 and 9 are essentially the same as those shown in FIGS. 3 and 4 with regard to fundamental aspects, and the bring about the desired effects similar to those of the embodiment shown in FIGS. 3 and 4. Of course, the embodiments shown in FIGS. 6, 8 and 9 are advantageous in that the memory capacity of the recording circuit 29 can be reduced by an amount required for storing the burst signal, because this signal is added subsequently and need not be recorded in the recording circuit 29.

Figure 10:
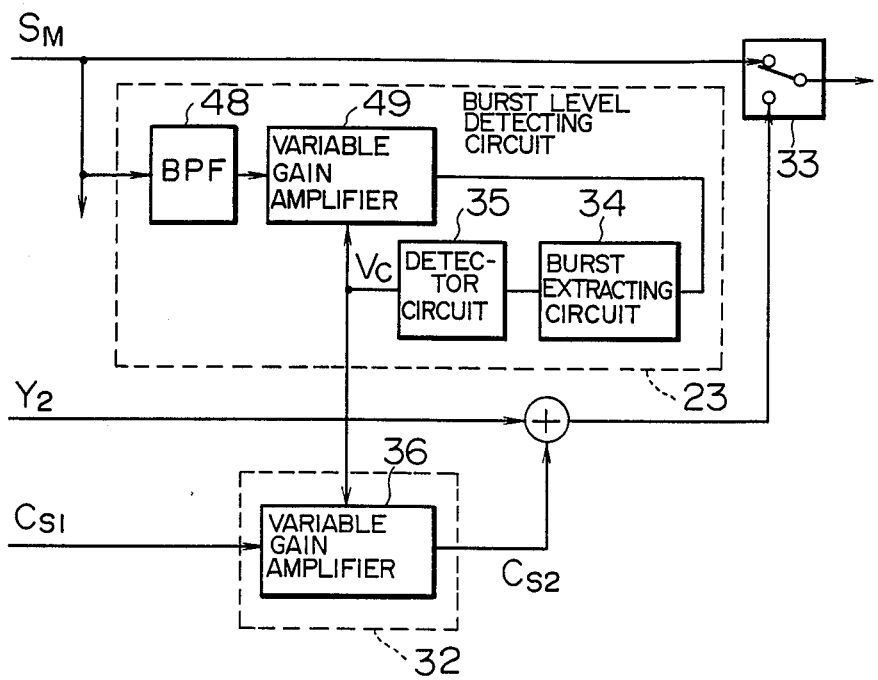
FIG. 10 is a view showing a main portion of the picture synthesizing apparatus according to an eighth embodiment of the invention.

FIG. 10 is a block diagram showing a main portion of an eighth embodiment of the picture synthesizing apparatus according to the present invention. In the figure, a reference numeral 48 denotes a band pass filter (BPF) and 49 denotes a variable gain amplifier.

Figure 11:
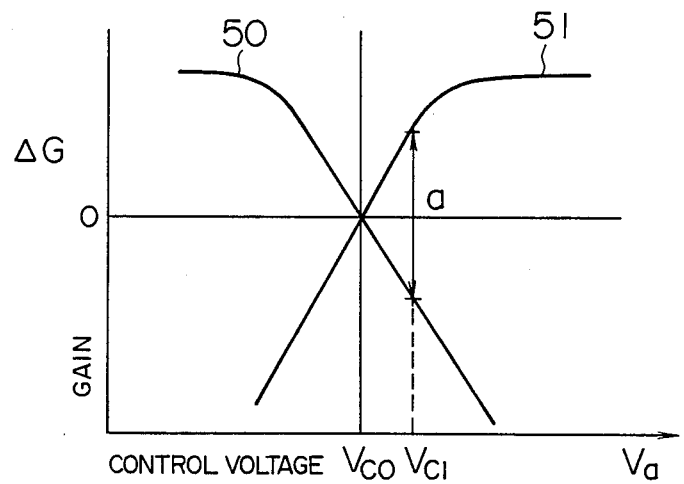
FIG. 11 is a view illustrating graphically the gain control characteristics of variable gain amplifiers employed in the circuit shown in FIG. 9.

The essential feature of this eighth embodiment can be seen in that the burst level detecting circuit 23 shown in FIG. 3 is constituted by the BPF 48, variable gain amplifier 49, burst extracting circuit 34 and the detector circuit 35 and that the gain control circuit 32 is constituted by a variable gain amplifier 36 having control characteristics opposite to that of the variable gain amplifier 49. Except for these points, the structures and arrangements of the APC circuit 24, LPF 25, BPF 26, ACC circuit 27, chrominance demodulation circuit 28, recording circuit 29, control circuit 30, chrominance modulation circuit and others are similar to those of the apparatus shown in FIG. 3. In FIG. 10, parts or circuits serving equivalent or identical functions as those of the apparatus shown in FIG. 3 are denoted by the same reference numerals, and further description thereof is omitted. FIG. 11 illustrates gain control characteristics of the variable gain amplifier circuits 36 and 49. In this figure in which gain is taken along the ordinate with control voltage being taken along the abscissa, curve 50 represents the gain control characteristic of the variable gain amplifier 49 and curve 51 represents the gain control characteristic of the variable gain amplifier 36.

Referring to FIG. 10 together with FIG. 11, operation of the embodiment shown in FIG. 10 will be described below.

Through the BPF 48, the chrominance signal is extracted from the main picture composite video signal $S_M$ as supplied. The extracted chrominance signal is inputted to the variable gain amplitude 49 whose gain is controlled by the output signal of the detector circuit 35. The chrominance signal applied to the variable gain amplifier 49 is amplified and supplied to the burst extracting circuit 34. In this circuit 34, the burst signal is extracted from the chrominance signal inputted thereto and is supplied to the detector circuit 35 which in turn detects the amplitude level of the burst signal. In accordance with the detected level of the burst signal, the gain of the variable gain amplifier 49 is correspondingly controlled. In this manner, the variable gain amplifier 49, the burst extracting circuit 34 and the detector circuit 35 cooperate together to constitute a so-called ACC loop which operates to maintain the level of the burst signal constant. More specifically, the detector circuit 35 produces the control voltage $V_c$ which causes the variable gain amplifier 49 to increase (or attenuate) gain of the chrominance signal by an amount of enhancement (or attenuation) relative to the rated level of the main picture chrominance signal. The control voltage $V_c$ is also supplied to the variable gain amplifier 36. However, since this circuit 36 has a gain control characteristic opposite to that of the variable gain amplifier 49, the control signal $V_c$ causes the variable gain amplifier 36 to attenuate (or enhance) the subsidiary picture chrominance signal by an amount of attenuation (or enhancement) relative to the rated level of the chrominance signal.

Now, circuit operation will be described by reference to FIG. 11. As mentioned hereinbefore, the curve 50 shown in FIG. 11 represents the gain control characteristic of the variable gain amplifier 49 and the curve 51 represents that of the variable gain amplifier 36.

Assuming now that the main picture chrominance signal is enhanced by a dB relative to the rated level, the detector circuit 35 produces the control voltage $V_{cl}$ which causes the gain of the variable gain amplifier circuit 49 to be attenuated by a dB, while the gain of the variable gain amplifier 32, controlled by this control voltage $V_{cl}$, is increased by a dB. Consequently, the subsidiary picture chrominance signal is enhanced by a dB equal to the enhancement of the main picture chrominance signal relative to the desired level.

As will be seen from the above, the main picture chrominance signal and the subsidiary picture chrominance signal contained in the picture-in-picture composite video signal are held at a constant level in the relative sense, as in the case of the preceding embodiments. It should be noted that according to the embodiment described just above, the burst signal for the subsidiary picture chrominance signal can be rendered unnecessary because the comparison of the burst signal level of the subsidiary picture chrominance signal with that of the main picture chrominance signal is not performed. This in turn means that the burst signal of the subsidiary picture chrominance signal need not be recorded, whereby the memory capacity of the recording circuit 29 can be correspondingly reduced, as is the case with the embodiments shown in FIGS. 6 and 9.

Although the foregoing description has been made on the assumption that the invention is applied to the picture-in-picture inlaying synthesization, it will be readily understood by those skilled in the art that the teachings of the present invention can be equally and effectively applied to various types of picture synthesizing apparatus for synthesizing two composite video signals for the display on the same screen, inclusive of superimposition and other kinds of synthesizations.

We claim:

1. A picture synthesizing apparatus, comprising:
    a first input terminal for receiving a main composite video signal;
    a second input terminal for receiving a subsidiary composite video signal;
    video signal compressing means for compressing the subsidiary composite video signal;
    signal combining means for combining the main composite video signal and the compressed subsidiary composite video signal by inlaying the compressed subsidiary composite video signal in the main composite video signal to allow production of a main video picture produced on the basis of the main composite video signal partly inlaid with a subsidiary video picture produced on the basis of the compressed subsidiary composite video signal;
    a first automatic gain control circuit connected to said first input terminal for regulating the amplitude level of the main composite video signal and supplying the regulated main composite video signal to said signal combining means; and
    a second automatic gain control circuit connected to said second input terminal for regulating the amplitude level of the subsidiary composite video signal and supplying the regulated subsidiary composite video signal to said signal combining means.

2. A picture synthesizing apparatus, comprising:
    a first input terminal for receiving a main composite video signal;
    a second input terminal for receiving a subsidiary composite video signal;
    detecting means for detecting the level of the chrominance signal of the main composite video signal;
    luminance signal separating means for separating the luminance signal from the subsidiary composite video signal to provide a subsidiary luminance signal;
    chrominance signal separating means for separating the chrominance signal from the subsidiary composite video signal to provide a subsidiary chrominance signal;
    an automatic color control circuit for amplifying the subsidiary chrominance signal to a predetermined level;
    video signal compressing means for compressing the subsidiary luminance signal and the amplified subsidiary chrominance signal;
    gain regulating means for regulating the amplitude of the compressed subsidiary chrominance signal in accordance with the detected level of the chrominance signal of the main composite video signal;
    an adder circuit for adding the compressed luminance signal and the regulated compressed subsidiary chrominance signal to thereby form a compressed subsidiary composite video signal; and picture synthesizing means for inlaying the compressed subsidiary composite video signal in the main composite video signal to provide a synthesized composite video signal so that a main video picture produced on the basis of the main composite video signal is inlaid in a part thereof with a subsidiary video picture based on the compressed subsidiary composite video signal.

3. A picture synthesizing apparatus according to claim 2, wherein said video signal compressing means includes:
- a chrominance demodulator circuit for demodulating the amplified subsidiary chrominance signal to provide color difference signals;
- a recording circuit for compressing the subsidiary luminance signal and the color difference signals;
- a control circuit for controlling said recording circuit;
- an automatic phase control circuit for generating a chrominance subcarrier signal phase-locked to a burst signal contained in the chrominance signal of the main composite video signal; and
- a chrominance modulation circuit for generating the compressed subsidiary chrominance signal from the compressed color difference signals and the chrominance subcarrier signal.

4. A picture synthesizing apparatus according to claim 2, wherein said detecting means includes:
- a first burst extracting circuit for extracting a first burst signal from the main composite video signal; and
- a first detector circuit for detecting the amplitude level of the extracted first burst signal;

and wherein said gain regulating means includes:
- a variable gain amplifier for amplifying the compressed subsidiary chrominance signal;
- a second burst extracting circuit for extracting a second burst signal from the amplified subsidiary chrominance signal;
- a second detector circuit for detecting the amplitude level of the second extracted burst signal; and
- a comparator for producing a signal indicative of the difference between the detected amplitude level of the extracted first burst signal and the detected amplitude level of the extracted second burst signal and supplying the produced signal to said variable gain amplifier;
- said variable gain amplifier amplifying the subsidiary chrominance signal with an amplification factor conforming to the signal supplied from said comparator and applying the amplified subsidiary chrominance signal to said adder circuit.

5. A picture synthesizing apparatus according to claim 2, wherein said video signal compressing means includes:
- a chrominance demodulator circuit for demodulating the amplified subsidiary chrominance signal to provide color difference signals;
- a recording circuit for compressing the subsidiary luminance signal and the color difference signals
- a control circuit for controlling said recording circuit;
- an automatic phase control circuit for generating a chrominance subcarrier signal phase-locked to a burst signal contained in the chrominance signal of said main composite video signal; and
- a chrominance modulation circuit for generating the compressed subsidiary chrominance signal from the compressed color difference signals and the chrominance subcarrier signal;

wherein said detecting means includes;
- a first burst extracting circuit for extracting a first burst signal from the main composite video signal; and
- a first detector circuit or detecting the amplitude level of the extracted first burst signal; and wherein said gain regulating means includes;
- a variable gain amplifier for amplifying the compressed subsidiary chrominance signal;
- a second burst extracting circuit for extracting a second burst signal from the amplified subsidiary chrominance signal
- a second detector circuit for detecting the amplitude level of the second extracted burst signal; and
- a comparator for producing a signal indicative of the difference between the detected amplitude level of the extracted first burst signal and the detected amplitude level of the extracted second burst signal and supplying the produced signal to said variable gain amplifier;
- said variable gain amplifier; amplifying the subsidiary chrominance signal with an amplification factor conforming to the signal supplied from said comparator and applying the amplified subsidiary chrominance signal to said adder circuit.

6. A picture synthesizing apparatus according to claim 3, wherein said video signal compressing means further includes a pulse adder for adding a pulse indicative of the burst signal to one of the color difference signals and supplying the resulting signal to said chrominance modulation circuit.

7. A picture synthesizing apparatus according to claim 3, wherein said video signal compressing means further includes a pulse adder for adding a pulse indicative of the burst signal contained in the chrominance signal of the main composite video signal to one of the color difference signals and supplying the resulting signal to said chrominance modulation circuit;

wherein said detecting means includes:
- a first burst extracting circuit for extracting a first burst signal from the main composite video signal; and
- a first detector circuit for detecting the amplitude level of the extracted first burst signal; and wherein said gain regulating means includes:
- a variable gain amplifier for amplifying the compressed subsidiary chrominance signal;
- a second burst extracting circuit for extracting a second burst signal from the amplified subsidiary chrominance signal;
- a second detector circuit for detecting the amplitude level of the second extracted burst signal; and
- a comparator for producing a signal indicative of the difference between the detected amplitude level of the extracted first burst signal and the detected amplitude level of the extracted second burst signal and supplying the produced signal to said variable gain amplifier;
- said variable gain amplifier amplifying the subsidiary chrominance signal with an amplification factor conforming to the signal supplied from said comparator and applying the amplified subsidiary chrominance signal to said adder circuit.

8. A picture synthesizing apparatus according to claim 3, wherein said video signal compressing means further includes a burst signal adder for adding the burst signal to the compressed subsidiary chrominance signal, and means for supplying the resulting signal to said gain regulating means.

9. A picture synthesizing apparatus according to claim 3, wherein said video signal compressing means further includes:
- a burst signal adder for adding the burst signal contained in the chrominance signal of the main composite video signal to the compressed subsidiary chrominance signal; and
- means for supplying the resulting signal to said gain regulating means;

wherein said detecting means includes:
- a first burst extracting circuit for extracting a first burst signal from the main composite video signal; and
- a first detector circuit for detecting the amplitude level of the extracted first burst signal; and wherein said gain regulating means includes;
- a variable gain amplifier for amplifying the compressed subsidiary chrominance signal;
- a second burst extracting circuit for extracting a second burst signal from the amplified compressed subsidiary chrominance signal;
- a second detector circuit for detecting the amplitude level of the second extracted burst signal; and
- a comparator for producing a signal indicative of the difference between the detected amplitude level of the extracted first burst signal and the detected amplitude level of the extracted second burst signal and supplying the produced signal to said variable gain amplifier;
- said variable gain amplifier amplifying the subsidiary chrominance signal with an amplification factor conforming to the signal supplied from said comparator and applying the amplified subsidiary chrominance signal to said adder circuit.

10. A picture synthesizing apparatus according to claim 2, wherein said gain regulating means includes:
- a first variable gain amplifier for amplifying the compressed subsidiary chrominance signal; and
- means for supplying the amplified compressed subsidiary chrominance signal to said adder circuit;

wherein said detecting means includes:
- a band pass filter for extracting the main chrominance signal from the main composite video signal;
- a second variable gain amplifier for amplifying the extracted main chrominance signal;
- a burst extracting circuit for extracting the burst signal from the extracted main chrominance signal;
- a detector circuit for detecting the amplitude level of the extracted burst signal; and
- means for applying the detected amplitude level value to said first variable gain amplifier and said second variable gain amplifier for controlling the gains of said first and second variable gain amplifiers, respectively, said first variable gain amplifier and said second variable gain amplifier exhibiting gain control characteristics opposite to each other.

11. A picture synthesizing apparatus according to claim 2, wherein said video signal compressing means includes:
- a chrominance demodulator circuit for demodulating the amplified subsidiary chrominance signal to provide color difference signals;
- a recording circuit for compressing the subsidiary luminance signal and the color difference signals;
- a control circuit for controlling said recording circuit;
- an automatic phase control circuit for generating a chrominance subcarrier signal phase locked to a burst signal contained in the chrominance signal of said main composite video signal; and
- a chrominance modulation circuit for generating the compressed subsidiary chrominance signal from the compressed color difference signals and the chrominance subcarrier signal;

wherein said gain regulating means includes:
- a first variable gain amplifier for amplifying the compressed subsidiary chrominance signal; and
- means for supplying the amplified compressed subsidiary chrominance signal to said adder circuit; and wherein said detecting means includes:
- a band pass filter for extracting the main chrominance signal from the main composite video signal;
- a second variable gain amplifier for amplifying the main chrominance signal;
- a burst extracting circuit for extracting the burst signal from the amplified main chrominance signal;
- a detector circuit for detecting the amplitude level of the extracted burst signal; and
- means for supplying the detected amplitude level value to said first variable gain amplifier and said second variable gain amplifier for controlling the gains of said first and second variable gain amplifiers, respectively, said first variable gain amplifier and said second variable gain amplifier exhibiting gain control characteristics opposite to each other.

12. A picture synthesizing apparatus for inlaying a first composite video signal with a second composite video signal to provide an inlaid composite video signal for display on a single display screen in the form of two pictures, said apparatus comprising:
- detecting means for detecting the signal level of the chrominance signal of a first composite video signal;
- gain regulating means for regulating the gain of the chrominance signal of a second composite video signal in accordance with the detected level of the chrominance signal of the first composite video signal; and
- signal combining means for inlaying the second composite video signal having a chrominance signal regulated by said gain regulating means into the first composite video signal to provide an inlaid composite video signal.

* * * * *